(12) United States Patent
Sekiya et al.

(10) Patent No.: US 11,214,710 B2
(45) Date of Patent: Jan. 4, 2022

(54) ANTI-CONTAMINATION AGENT COMPOSITION

(71) Applicant: MAINTECH CO., LTD., Tokyo (JP)

(72) Inventors: Hiroshi Sekiya, Tokyo (JP); Kazuyuki Yusa, Fuji (JP)

(73) Assignee: MAINTECH CO., LTD., Tokyo (JP)

( * ) Notice: Subject to any disclaimer, the term of this patent is extended or adjusted under 35 U.S.C. 154(b) by 0 days.

(21) Appl. No.: 16/648,772

(22) PCT Filed: Jan. 16, 2020

(86) PCT No.: PCT/JP2020/001398
§ 371 (c)(1),
(2) Date: Mar. 19, 2020

(87) PCT Pub. No.: WO2020/202704
PCT Pub. Date: Oct. 8, 2020

(65) Prior Publication Data
US 2021/0032497 A1 Feb. 4, 2021

(30) Foreign Application Priority Data
Mar. 29, 2019 (JP) .............................. JP2019-069260

(51) Int. Cl.
*C09D 183/04* (2006.01)
*C09D 5/00* (2006.01)
(Continued)

(52) U.S. Cl.
CPC .............. *C09D 183/04* (2013.01); *C09D 5/00* (2013.01); *D06N 3/0006* (2013.01);
(Continued)

(58) Field of Classification Search
USPC ............................................. 528/14, 21, 32
See application file for complete search history.

(56) References Cited

U.S. PATENT DOCUMENTS 2,954,357 A * 9/1960 Fekete .................... C08L 83/04
524/264
3,419,423 A * 12/1968 Quaal .................. C09D 183/14
427/387
(Continued)

FOREIGN PATENT DOCUMENTS

JP H10-310768 A 11/1998
JP 2000-015908 A 1/2000
(Continued)

*Primary Examiner* — Lynda Salvatore
(74) *Attorney, Agent, or Firm* — Muncy, Geissler, Olds & Lowe, P.C.

(57) ABSTRACT

[Problem] To provide a contamination preventing agent composition capable of effectively preventing pitch contamination in a dry part. [Solution] The present invention relates to a contamination preventing agent composition for preventing pitch contamination in a dry part D of a papermaking process, the composition containing: a linear polysiloxane compound represented by formula (1); and a cyclic siloxane compound. [In formula (1), a substituent $R^1$ represents, in the same molecule, a hydrogen atom, an alkyl group, a methylphenyl group, a polyether group, a higher fatty acid ester group, an amino-modified group, an epoxy-modified group, a carboxylic group, a phenol group, a mercapto group, a carbinol group, or a methacrylic group, and a repeating number n of a siloxane unit represents an integer of 20-1430.]

(1)

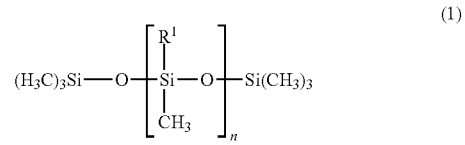

14 Claims, 1 Drawing Sheet

(51) Int. Cl.
*D06N 3/00* (2006.01)
*D06N 3/12* (2006.01)
*D21F 5/02* (2006.01)
*D21F 7/08* (2006.01)
*D21F 7/12* (2006.01)

(52) U.S. Cl.
CPC .......... *D06N 3/0059* (2013.01); *D06N 3/128* (2013.01); *D21F 5/02* (2013.01); *D21F 7/083* (2013.01); *D21F 7/12* (2013.01)

(56) References Cited

U.S. PATENT DOCUMENTS

| | | | | |
|---|---|---|---|---|
| 4,138,543 A | * | 2/1979 | Bargain | ............... C08G 77/08 |
| | | | | 528/14 |
| 2004/0084165 A1 | * | 5/2004 | Shannon | ............... D21H 17/59 |
| | | | | 162/158 |
| 2014/0128521 A1 | | 5/2014 | Sekiya | |
| 2014/0206805 A1 | | 7/2014 | Sekiya | |
| 2018/0117221 A1 | * | 5/2018 | Yatabe | ................ C09D 183/06 |
| 2020/0098487 A1 | * | 3/2020 | Kim | .......................... C07F 7/08 |

FOREIGN PATENT DOCUMENTS

| | | |
|---|---|---|
| JP | 2004-322089 A | 11/2004 |
| JP | 2008-284408 A | 11/2008 |
| JP | 2009-509024 A | 3/2009 |
| JP | 4868628 B1 | 2/2012 |
| JP | 4868629 B1 | 2/2012 |
| JP | 2014-114425 A | 6/2014 |
| JP | 2017-130399 A | 7/2017 |
| WO | 2011/105254 A1 | 9/2011 |
| WO | 2012/168986 A1 | 12/2012 |
| WO | 2013/005247 A1 | 1/2013 |

* cited by examiner

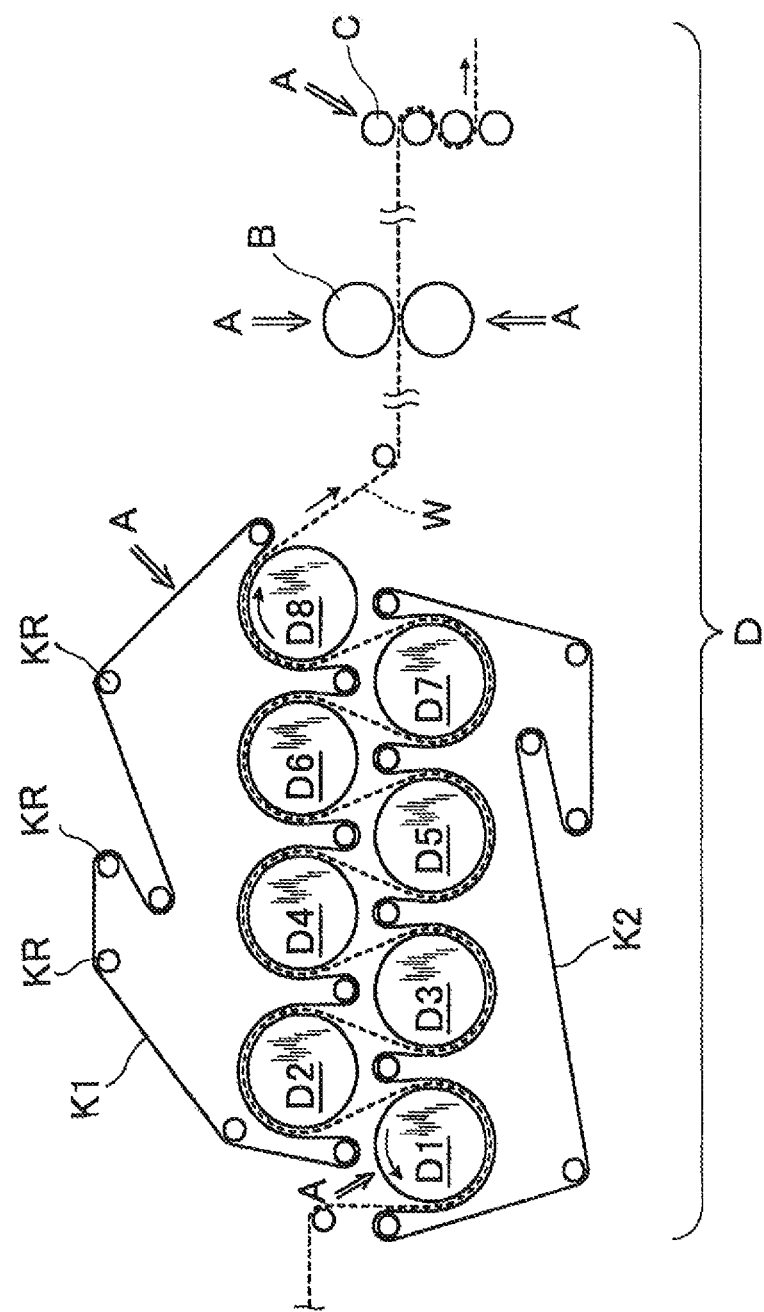

ANTI-CONTAMINATION AGENT COMPOSITION

TECHNICAL FIELD

The present invention relates to an anti-contamination agent composition, and more specifically to an anti-contamination agent composition that can effectively prevent pitch contamination in a dry part.

BACKGROUND ART

A paper-making process in a paper-making machine has generally a wire part in which pulp-dispersed water is placed on a net (wire) and excessive water is allowed to naturally drop down to prepare a wet paper sheet, a press part in which the wet paper sheet is passed between a pair of pressing rolls to be pressed by the pressing roils with felt being inserted between the paper sheet and the rolls to transfer moisture in the wet paper sheet onto the felt, and thereby the wet paper sheet is dehydrated, a dry part in which the wet paper sheet having passed through the press part is put in contact with a heated drier roll to be dried to form a paper sheet, and a reel part in which the paper sheet is wound onto a rod called a spool.

The dry part includes devices such as a cylindrical drier roll for heating and drying the wet paper sheet, a canvas for pressing the wet paper sheet against the drier roll, a canvas roll for guiding the canvas, a calender roll for adjusting the smoothness and the thickness of the dried paper sheet, and a breaker stack roll for gently adjusting the smoothness and the thickness of the dried paper sheet. These devices directly or indirectly contact the wet paper sheet, and thereby, if pitch adheres to the surface of the devices, the pitch transfers to the wet paper sheet, causing contamination of the wet paper sheet and thus resulting in significant degradation of the yield.

Here, the pitch is a sticky contaminant resulting from wood as a row material for paper or resin contained in recycled waste paper.

For this problem, it has been known that an anti-contamination agent composition containing silicone-based compound, which is applied to a dry part, can prevent pitch contamination.

For example, the anti-contamination agent composition has been known, which contains a polysiloxane compound having a predetermined chemical structure in which the number of amino-modified groups per molecule of the polyslioxane compound is 0.5 to 5 (for example, see Patent Literature 1).

In addition, an anti-contamination agent composition has been known, which contains a low molecular polysiloxane compound having a predetermined chemical structure and a high-molecular polysiloxane compound having a predetermined chemical structure, in which the low-molecular polysiloxane compound has a kinematic viscosity at 25° C. of 10 to 300 $mm^2/s$ and the high-molecular polysiloxane compound has a kinematic viscosity at 25° C. of 40 to 90,000 $mm^2/s$, in which the low-molecular polysiloxane compound has 0.1 to 3.0 modified groups per molecule and the high-molecular polysiloxane compound has 1.0 to 10 modified groups per molecule, and in which the low molecular polysiloxane compound has the number m of repeating polys dioxane units and the high molecular polysiloxane compound has the number n of repeating polysiloxane units, the number m and the number n being designed to satisfy the relationship: $2m \leq n$ (for example, see Patent Literature 2).

These anti-contamination agent compositions can prevent pitch contamination in a dry part, even though not quite satisfactorily. It should be noted that the present invention corresponds to improvements of these inventions.

CITATION LIST

Patent Literature

PTL 1: Japanese Patent. No. 4868628
PTL 2: Japanese Patent No. 4868629

SUMMARY OF INVENTION

Technical Problem

Although the anti-contamination agent compositions described in above PTL 1 and 2 have the effect of dispersing pitch and thereby preventing pitch contamination, the effect is insufficient. In other words, the pitch dispersibility is insufficient and undispersed pitch may read here to a dry part.

The present invention has been studied in terms of the above-described problem, and its purpose is to provide an anti-contamination agent composition that can effectively prevent pitch contamination in a dry part.

Solution to Problems

The inventors have extensively studied to solve the above-described. problem and have found a cyclic siloxane compound as a component that effectively disperses pitch.

The study has found that adding a cyclic siloxane compound to an anti-contamination agent composition can solve the above-described problem, and completed the present invention.

The present invention relates to (1) an anti-contamination agent composition for preventing pitch contamination in a dry part of a paper-making process, the composition containing a linear polysiloxane compound represented by following formula (1) and a cyclic siloxane compound.

[Formula 1]

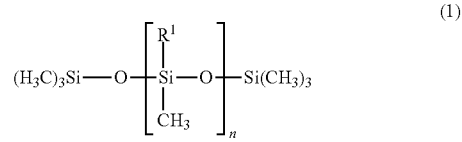

(1)

[wherein substituents $R^1$ represent a hydrogen atom, an alkyl croup, a methylphenyl group, a polyether group, a higher fatty acid ester group, an amino-modified group, an epoxy-modified group, a carboxy group, a phenol group, a mercapto group, a carbinol group, or a methacryl group in one molecule, and the number n of repeating siloxane units represents an integer from 20 to 1430].

The present invention relates to the anti-contamination agent composition of above-described (1), in which (2) at least one of substituents $R^1$ in one molecule is an amino-modified group represented by following formula (2).

[Formula 2]

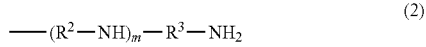

(2)

[wherein substituents $R^2$ and $R^3$ each independently represent an alkylene group having 1 to 6 carbon atoms, and the number m of repeating aminoalkylene units represents an integer from 0 to 2.

The present invention relates to the anti-contamination agent composition of above-described (1) or (2), in which (3) a cyclic siloxane compound is at least one compound selected from the group consisting of octamethylcyclotetrasiloxane, decamethylcyclopentasiloxane, and dodecamethylcyclohexasiioxane.

The present invention relates to the anti-contamination agent composition of any one of above-described (1) to (3), in which (4) the blending quantity of the cyclic siloxane compound is 15 to 20,000 ppm.

The present invention relates to the anti-contamination agent composition of any one of above-described (1) to (4), in which (5) the blending mass ratio of the cyclic siloxane compound to the polysiioxane compound is 1:5 to 50,000.

The present invention relates to the anti-contamination agent composition of any one of above-described (1) to (5), in which (6) the composition that further contains an emulsifier and water is emulsion having a median diameter of 0.01 to 5.0 μm.

The present invention relates to the anti-contamination agent composition of any one of above-described (1) to (6), in which (7) the composition having a zeta potential of 10 to 90 in absolute value is applied to a cast-iron drier roll or a polyester canvas in a dry part.

The present invention relates to the anti-contamination agent composition of any one of above-described (1) to (7), (8) the composition having a surface tension of 65 mN/m or less and having a contact angle to a cast-iron drier roll of 80° or less is app d lie to the cast-iron drier roll in a dry part.

The present invention relates to the anti-contamination agent composition of any one of above-described (1) to (8), (9) the composition having surface tension of 65 mN/m or less and having a contact angle to a polyester canvas of 80° or less is applied to the polyester canvas in a dry part.

ADVANTAGEOUS EFFECTS OF INVENTION

The anti-contamination agent composition of the present invention, which contains the linear polysiloxane compound represented by aforementioned formula (1), is applied to a dry part (for example, a drier roll) to form a film on the dry part, resulting in preventing pitch adhesion (a pitch adhesion preventing effect). Thus, the anti-contamination agent composition can prevent pitch contamination in a dry part.

In addition, the anti-contamination agent composition, which further contains the cyclic siloxane compound, can efficiently disperse pitch (a pitch dispersing effect). In other words, the cyclic siloxane compound, which effectively disperses pith that has been inhibited from adhesion, can prevent not only first adhesion but readhesion of the pitch. It should be noted that the blending quantity of the cyclic siloxane compound is preferably in the aforementioned range in terms of the sufficient pitch dispersing effect to be exerted.

By these effects, the anti-contamination agent composition of the present invention can effectively prevent pitch contamination in a dry part.

The anti-contamination agent composition of the present invention, if at least one of substituents $R^1$ in one molecule is an amino-modified group represented by the aforementioned formula (2), can enhance the holding power of a film formed by the linear polysiloxane compound. In other words, the film is encouraged to fix onto a dry part.

The anti-contamination agent composition of the present invention, if the cyclic siloxane compound is at least one compound selected from the group consisting of octamethylcyclotetrasiloxane, decamethylcyclopentasiloxane, and dodecamethylcyclohexasiloxane, can reliably exert the pitch dispersing effect.

In the anti-contamination agent composition of the present invention, the blending mass ratio of the polysiloxane compound to the cyclic silioxane compound is preferably in the aforementioned range. This preferred blending mass ratio produces excellent balance between the pitch adhesion preventing effect and the pitch dispersing effect. In other words, it can inhibit poor dispersibility of pitch due to pitch adhesion, and slow dispersion for pitch.

In the anti-contamination agent composition of the present invention, which further contains an emulsifier and water to be an emulsion with a median diameter being in the aforementioned range, even if the composition is a mixture of the polysiloxane compound and the cyclic siloxane compound, the composition has excellent dispersion stability for both compounds. This enables uniform application to a dry part while maintaining predetermined ratio of the polysiloxane compound to the cyclic siloxane compound.

The anti-contamination agent composition of the present invention, if its zeta potential is in the aforementioned range in absolute value, has an advantage of being readily fixed onto the surface of a cast-iron drier roll or a polyester canvas due to the electric action. This can suppress a problem that the anti-contamination agent composition applied to a drier roll transfers to a wet paper sheet in contact with the drier roll with the composition little remaining on the drier roll, or the anti-contamination agent composition applied to a canvas transfers to a wet paper sheet in contact with the canvas with the composition little remaining on the canvas.

In the anti-contamination agent composition of the present invention, its surface tension is adjusted to be in the aforementioned range so that a film is readily formed on the surface of a cast-iron drier roil or the surface of a polyester canvas. This can enhance the pitch adhesion preventing effect, and also enhance the pitch dispersing effect because the composition is readily made to penetrate pitch.

In the anti-contamination agent composition of the present invention, its contact angle to a cast-iron drier roll is adjusted to 80° or less so that a film is readily formed on the surface of the drier roll.

In addition, in the anti-contamination agent composition, its contact angle to a polyester canvas is adjusted to 80° or less so that a film is readily formed on the surface of the canvas.

These can further enhance the pitch adhesion preventing effect.

BRIEF DESCRIPTION OF DRAWINGS

FIG. 1 is a schematic diagram showing a dry part to which the anti-contamination agent composition according to the present invention is applied.

DESCRIPTION OF EMBODIMENTS

Hereinafter, preferred embodiments of the present invention will be described in detail with reference to the drawing as necessary. It should be noted that the vertical and horizontal positional relations are, unless otherwise stated, based on the positional relations shown in the drawing. In addition, the dimensional ratios are not limited to the ratios illustrated in the drawing.

The anti-contamination agent composition according to the present invention, which is applied to a dry part in a paper-making process, can prevent the dry part from being contaminated with pitch (hereinafter, referred to as "pitch contamination").

The dry part includes devices such as a drier roll, a canvas, a canvas roll, a calender roll, and a breaker stack roll. The details of the dry part will be described later.

The anti-contamination agent composition according to the present invention contains a linear polysiloxane compound, a cyclic siloxane compound, an emulsifier, and water.

When the anti-contamination agent composition is applied to the dry part, the polysiloxane compound forms a film on the surface of the dry part and thereby exerts the pitch adhesion preventing effect.

At this time, the coexisting cyclic siloxane compound exerts the pitch dispersing effect.

By these actions, the anti-contamination agent composition can effectively prevent pitch contamination in the dry part.

The anti-contamination agent composition is an emulsion, in which an oleaginous polysiloxane compound and cyclic siloxane compound, and aqueous water are emulsified by an emulsifier.

The emulsion preferably has a median diameter of 0.01 to 5.0 µm. In this case, even if the composition is a mixture of the poiysiioxane compound and the cyclic siloxane compound, both compounds have an excellent sequential dispersion stability.

If the median diameter is less than 0.01 µm, the water resistance of a formed film may deteriorate as compared with the case of the median diameter being in the above range. If the median diameter is greater than 5.0 µm, the emulsion stability may deteriorate as compared with the case of the median diameter being in the above range.

When the anti-contamination agent composition is applied to a cast-iron drier roll, its zeta potential is preferably −90 to −10, or +10 to +90. In other words, it is preferably 10 to 90 in absolute value. In this case, the composition has an advantage of being readily fixed onto the surface of the drier roll due to the electric action.

If the zeta potential is less than 10 in absolute value, the adsorptivity of the anti-contamination agent composition to the drier roll surface and the emulsion stability may deteriorate, as compared with the case of the zeta potential being in the above range. If the zeta potential is greater than 90 in absolute value, the adsorptivity of the anti-contamination agent composition to the drier roll surface is likely excessive, causing insufficient transfer of the anti-contamination agent composition to a wet paper sheet, as compared with the case of the zeta potential being in the above range. It should be noted, as described later, transfer of a proper quantity of the anti-contamination agent composition to the wet paper sheet enables the anti-contamination agent composition to retransfer to a downstream dry part with which the wet paper sheet will come into contact.

Likewise, when the anti-contamination agent composition is applied to a polyester canvas, its zeta potential is preferably −90 to −10, or +10 to +90. In other words, it is preferably 10 to 90 in absolute value. In this case, the composition has an advantage of being readily fixed onto the surface of the canvas due to the electric action.

If the zeta potential is less than 10 in absolute value, the adsorptivity of the anti-contamination agent composition to the surface of the canvas and the emulsion stability may deteriorate, as compared with the case of the zeta potential being in the above range. If the zeta potential is greater than 90 in absolute value, the adsorptivity of the anti-contamination agent composition to the surface of the canvas is likely excessive, causing insufficient transfer of the anti-contamination agent composition to a wet paper sheet, as compared with the case of the zeta potential being in the above range. It should be noted, as described later, transfer of a proper quantity of the anti-contamination agent composition to the wet paper sheet enables the anti-contamination agent composition to retransfer to a downstream dry part with which the wet paper sheet will come into contact.

When the anti-contamination agent composition is applied to a cast-iron drier roll, its surface tension (dynamic surface tension at a lifetime of 100 milliseconds measured by a maximum bubble pressure method) is preferably 65 mN/m or less. In this case, the composition has an advantage of being readily fixed onto the surface of the drier roll.

If the surface tension is greater than 65 mN/m, the growth rate of film forming onto the drier roll surface may decrease, causing insufficient formation of a film, as compared with the case of the surface tension being in the above range.

It should be noted that the value of the surface tension was measured at 25° C. by using an automatic dynamic surface tensiometer BP-D5 (Kyowa Interface Science).

Likewise, when the anti-contamination agent composition is applied to a polyester canvas, its surface tension (dynamic surface tension at a lifetime of 100 milliseconds measured by a maximum bubble pressure method) is preferably 65 mN/m or less. In this case, the composition has an advantage of being readily fixed onto the surface of the canvas.

If the surface tension is greater than 65 mN/m, the growth rate of film forming onto the surface of the canvas may decrease, causing insufficient formation of a film, as compared with the case of the surface tension being in the above range.

When the anti-contamination agent composition is applied to a cast-iron drier roll, its contact angle to the drier roll is preferably 80° or less. In this case, the composition can instantly form a film on the surface of the drier roll.

It should be noted that the contact angle was measured at 25° C., 50% humidity using DropMaster DMs-401 with a Teflon needle 18G.

In addition, cast-iron used for contact angle measurement and cast-iron for a drier roll may be either the same or different. Provided, however, both cast-iron for contact angle measurement and a drier roll preferably have a 10-point average roughness (Rz): 0.16 µm or less, a maximum height (Rmax): 0.21 µm or less, and an arithmetic average roughness (Ra): 0.04 µm or less.

Likewise, when the anti-contamination agent composition is applied to a polyester canvas, its contact angle to the canvas is preferably 80° or less. In this case, the composition can instantly form a film on the surface of the canvas.

In the anti-contamination agent composition, the polysiloxane compound is linear, which is represented by following formula (1).

[Formula 3]

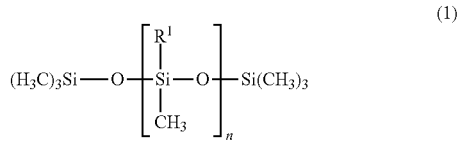

(1)

In the polysiloxane compound represented by formula (1), substituents $R^1$ include a hydrogen atom, an alkyl group, a methylphenyl group, a polyether group, a higher fatty acid ester group, an amino-modified group, an epoxy-modified group, a carboxy group, a phenol group, a mercapto group, a carbinol group, and a methacryl group, etc. It should be noted that substituents $R^1$ may be either all the same or different from each other in one molecule.

In addition, in the anti-contamination agent composition, the polysiloxane compounds having different substituents $R^1$ may be mixed.

In particular, substituents $R^1$ are preferably the methyl group (s) and/or the amino-modified group (s), and more preferably reactive amino-modified groups in one molecule of the porysiloxane compound in terms of the holding power of a film on a drier roll surface.

Here, the epoxy-modified group includes an epoxy alkyl group or an epoxy polyether group.

In addition, the amino-modified group is represented by following formula (2).

[Formula 4]

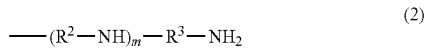

(2)

In the amino-modified group represented by formula (2), substituents $R^2$ and $R^3$ are each independently an alkylene group having 1 to 6 carbon atoms.

In particular, substituents $R^2$ and $R^3$ in the amino-modified group are each independently an ethylene group or a propylene group in terms of the holding power of a film on a drier roll surface.

In addition, substituents $R^2$ and $R^3$ being different alkylene groups are preferred in terms of the holding power of a film on a drier roil surface, and specifically, substituent $R^2$ being propylene group and substituent being ethylene group are particularly preferred.

In the amino-modified group represented by formula (2), the number m of repeating aminoalkylene units is an integer from 0 to 2. It should be noted, if the number m of repeating aminoalkylene units is 0, the amino-modified group has no substituent $R^2$.

If the number m of repeating aminoalkylene units is greater than 3, the holding power of a film on a drier roll surface may decrease, causing deterioration of the pitch adhesion preventing effect.

In particular, the number m of repeating aminoalkylene units in the amino-modified group is preferably 1.

In the anti-contamination agent composition, the number of the amino-modified groups per molecule of the polysiloxane compound is preferably 0.5 to 5, and more preferably 0.5 to 3, in terms of the film holding power and the pitch contamination preventing effect.

If the number of the amino-modified groups is less than 0.5, the holding power of a film on a drier roll surface may decrease, causing deterioration of the pitch adhesion preventing effect, as compared with the case of the number of the amino-modified groups being in the above range. If the number of the amino-modified groups is greater than 5, ionicity increases and the anti-contamination agent composition excessively accumulates on the surface of the dry part, which disadvantageously causes increase of the stickiness of the dry part surface and thereby conversely encourages pitch to adhere to the dry part, as compared with the case of the number of the amino-modified groups being in the above range.

In the present specification, "the number of the amino-modified groups per molecule of the polysiloxane compound" refers to an average number of the amino-modified groups included in one molecule, which specifically represents a value obtained by dividing the total number of the amino-modified groups by the number of the molecules. In other words, if the number of the amino-modified groups per molecule is 0.1, this means that the total number of the amino-modified groups in 10 molecules is one.

In the polysiloxane compound represented by formula (1), the number n of repeating siloxane units is an integer from 20 to 1430, preferably from 50 to 1,000, and more preferably from 100 to 800.

If the number n of repeating siloxane units is less than 20, a film may be insufficiently formed. If the number n of repeating siloxane units is greater than 1430, the polysiloxane compound having high viscosity disadvantageously becomes sticky to adhere to the surface of the dry part, and thereby conversely encourages pitch to adhere to the dry part.

The polysiloxane compound has a kinematic viscosity at 25° C. that is preferably 20,000 $mm^2/s$ or less, more preferably 10,000 $mm^2/s$ or less.

If the kinematic viscosity is greater than 20,000 $mm^2/s$, the stickiness disadvantageously increases as compared with the case of the kinematic viscosity being in the above range, and thereby conversely encourages pitch to adhere to the dry part.

In the anti-contamination agent composition, the cyclic siloxane compound is a monomolecular compound in which siloxane units connect each other to form a cyclic structure.

Specifically, the cyclic siloxane compound is preferably at least one compound selected from the group consisting of octamethylcyclotetrasiloxane, decamethylcyclopentasiloxane, and dodecamethylcyclohexasiloxane, and more preferably the at least one compound having another substituent in its molecule.

Such substituent includes an alkyl group, a methylphenyl group, a polyether group, a higher fatty acid ester group, an amino-modified group, an epoxy-modified group, a carboxy group, a phenol group, a mercapto group, a carbinol group, or a methacryl group. It should be noted that the substituent may be provided such that one molecule has either a plurality of the same substituents or a plurality of different substituents.

In particular, the substituent is preferably an amino-modified group. In other words, the cyclic siloxane compound preferably has an amino-modified group other than a methyl group in its molecule. Specifically, the cyclic siloxane compound is more preferably at least one compound selected from the group consisting of octamethylcyclotetrasiloxane having an amino-modified group, decamethylcyclopentasiloxane having an amino-modified group, and dodecamethylcyclohexasiloxane having an amino-modified group.

In this case, the pitch dispersing effect can be efficiently exerted.

In addition, the substituent of the cyclic siloxane compound is preferably the same as substituents $R^1$ of the coexisting linear polysiloxane compound shown in formula (1).

In this case, the anti-contamination agent composition has an improved storage stability, due to the excellent compatibility between the cyclic siloxane compound and the linear polysiloxane compound.

In addition, more preferably, the cyclic siloxane compounds of octamethylcyclotetrasiloxane having an amino-modified group, decamethylcyclopentasiloxane having an amino-modified group, and dodecamethylcyclohexasiloxane having an amino-modified group are all contained in the composition.

In this case, preferably, the quantity of octamethylcyclotetrasiloxane and decamethylcyclopentasiloxane makes up greater than or equal to 70% of the total quantity of the cyclic siloxane compounds.

In the anti-contamination agent composition, an employed emulsifier is preferably a nonionic surfactant or an anionic surfactant.

In particular, the emulsifier is preferably a nonionic surfactant, more preferably polyoxyethylene decyl ether, polyoxyethylene cetyl ether, or polyoxyethylene stearyl ether.

In this case, such emulsifiers can not only enhance the emulsion stability of the polysiloxane compound but inhibit discoloration of paper. Here, when colored paper such as cardboard is manufactured by a paper-making machine, the use of polyoxyethylene alkyl ether having a low molecular alkyl group as an emulsifier disadvantageously causes discoloration and color spotting of the paper. However, the use of polyoxyethylene alkyl ether having an alkyl group of a decyl group, a cetyl group, or a stearyl group as an emulsifier can inhibit the discoloration.

In the anti-contamination agent composition, the blending ratio of the polysiloxane compound is preferably 0.1 to 40% by mass, more preferably 2.0 to 20% by mass, in terms of preventing pitch adhesion.

If the blending ratio of the polysiloxane compound is less than 0.1% by mass, the anti-contamination agent composition itself may be absorbed by a wet paper sheet before water in the anti-contamination agent composition evaporates, causing insufficient film forming, as compared with the case of the blending ratio being in the above range. If the blending ratio of the polysiloxane compound is greater than 40% by mass, the viscosity of the anti-contamination agent composition itself increases as compared with the case of the blending ratio of the polysiloxane compound being in the above range, which makes the uniform sprayability of the composition onto a dry part surface to be poor, as well as makes the tackiness of the composition to be greater and possibly causes tearing of a paper sheet surface.

In the anti-contamination agent composition, the blending quantity of the cyclic siloxane compound is preferably 15 to 20,000 ppm, more preferably 80 to 10,000 ppm, still more preferably 100 to 1,000 ppm, in terms of the pitch dispersing effect to be sufficiently exerted.

If the blending quantity of the cyclic siloxane compound is less than 15 ppm, the pitch dispersing effect is disadvantageously insufficient as compared with the case of blending quantity being in the above range. If the blending quantity of the cyclic siloxane compound is greater than 20,000 ppm, the compound will excessively accumulate on the surface of the dry part as compared with the case of blending quantity being in the above range, which disadvantageously causes increase of the stickiness of the dry part surface and thereby conversely encourages pitch to adhere to the dry part.

In the anti-contamination agent composition, the blending mass ratio of the cyclic siloxane compound to the polysiloxane compound is preferably 1:5 to 50,000, in terms of the balance between the pitch adhesion preventing effect and the pitch dispersing effect.

If the blending mass ratio of the polysiloxane compound relative to 1 part by mass of the cyclic siloxane compound is less than 5 parts by mass, the pitch adhesion preventing effect may be insufficient as compared with the case of the blending mass ratio being in the above range.

If the blending mass ratio of the polysiloxane compound relative to 1 part by mass of the cyclic siloxane compound is greater than 50,000 parts by mass, the pitch dispersing effect may be insufficient as compared with the case of the blending mass ratio being in the above range.

In the anti-contamination agent composition, the blending ratio of the emulsifier relative to 1 part by mass of the polysiloxane compound is preferably 0.05 to 0.4 part by mass, more preferably 0.1 to 0.2 part by mass.

If the blending ratio of the emulsifier is less than 0.05 part by mass, the emulsion stability may be insufficient as compared with the case of the blending ratio of the emulsifier being in the above range. If the blending ratio of the emulsifier is greater than 0.4 part by mass, the extent of discoloration disadvantageously increases as compared with the case of the blending ratio of the emulsifier being in the above range.

Besides these components, the anti-contamination agent composition may contain additives, such as a chelating agent, a pH adjusting agent, an antiseptic agent, a viscosity adjusting agent, a lubricating agent, a wetting agent, a dusting inhibitor, a mold releasing agent, an adhesive agent, a surface modifying agent, a cleaning agent, a paper strengthening agent, a sizing agent, a yield improving agent, a water repellent agent, an oil repellent agent, an anti-slipping agent, a lubricant, and a softening agent.

Here, the above-described lubricating agent includes mineral oil, such as gear oil, drier oil, turbine oil and spindle oil; plant oil, such as coconut oil, linseed oil, castor oil, rapeseed oil and corn oil; paraffins, such as liquid paraffin and isoparaffin; and synthetic oil, such as polyisobutylene, polybutene, maleated polybutene, polyethylene wax and micro wax.

Next, a description is made for a method of producing the anti-contamination agent composition according to the present embodiment.

The anti-contamination agent composition is produced through a process in which the polysiloxane compound, the cyclic siloxane compound and the emulsifier are added to water and then stirred so that the polysiloxane compound and the cyclic siloxane compound are emulsified.

For the stirring process, a mixer, a homogenizer, and a mill, etc. are used, as appropriate.

Next, a description is made for a method of using the anti-contamination agent composition in a dry part. FIG. 1 is a schematic diagram showing a dry part to which the anti-contamination agent composition according to the present invention is applied.

As shown in FIG. 1, the anti-contamination agent composition is used in a dry part D.

Dry part D is provided with a wet paper sheet W, a plurality of cylindrical drier rolls D1, D2, D1, D4, D5, D6, D7, and D8 (hereinafter, referred to as "D1 to D8") for heating and drying the wet paper sheet W, canvases K1 and K2 pressing the wet paper sheet W onto drier rolls D1 to D8, a canvas roll KR guiding canvases K1 and K2, breaker stack rolls B adjusting the smoothness and thickness of dried paper sheet N gently, and a calender roll C adjusting the smoothness and thickness of dried paper sheet W.

In dry part D, drier rolls D1 to D8 are made of cast-iron.

Here, cast-iron is obtained by casting an alloy containing iron as a primary component and at least one substance selected from the group consisting of nickel, chromium, carbon and silicon.

In dry part D, wet paper sheet W is pressed against the surfaces of rotating drier rolls D1 to D8 by canvases K1 and K2. Wet paper sheet H is thereby leaded to adhere to drier rolls D1 to D8 so as to be simultaneously heated and dried. Wet, paper sheet W is subsequently sandwiched by breaker stack rolls B, and then densified by calender roll C.

In the above-described method of using the anti-contamination agent composition, as shown in FIG. 1, the anti-contamination agent composition is directly applied to drier rolls D1 to D8, canvases K1 and K2, breaker stack rolls B and a calender roll C of dry part D respectively at each position indicated by arrows A.

In this process, the anti-contamination agent composition applied to dry part D transfers to wet paper sheet H in contact with dry part D, and wet paper sheet W is further conveyed to come into contact with downstream dry part D, to which the anti-contamination agent composition can retransfer. Thus, by simply applying sufficient quantity of the anti-contamination agent composition to upstream dry part D, pitch contamination in downstream dry part D, which is downstream from the composition applied region, will be probably prevented.

Here, the method of applying the anti-contamination agent composition includes, but not particularly limited to, for example, methods such as a liquid shower system and a mist spray system with a scatter nozzle, etc.

In addition, the anti-contamination agent composition may be sprayed with a scatter nozzle being slid along paper sheet width. The anti-contamination agent composition is sprayed over a dry part, and thereby pitch contamination is prevented.

In this process, the spray quantity of the anti-contamination agent composition per unit area of a paper sheet through which the composition passes is preferably 10 to 10,000 $\mu g/m^2$, and more preferably 30 to 1,000 $\mu g/m^2$ as a solid content of the polysiloxane compound.

If the spray quantity is less than 10 $\mu g/m^2$, the anti-contamination agent composition insufficiently adheres to the surface of a dry part and can likely inhibit pitch adhesion insufficiently, as compared with the case of the spray quantity being in the above range. If the spray quantity is greater than 10,000 $\mu g/m^2$, an excess composition accumulates on the surface of a dry part, and pitch may be caught therein to increase stains or the meshes of a canvas may be clogged, as compared with the case of the spray quantity being in the above range.

Although preferred embodiments of the present invention are described above, the present invention should not be limited to the above-described embodiments.

For example, although the anti-contamination agent composition according to the present embodiments contains the linear polysiloxane compound, the cyclic siloxane compound, the emulsifier, and water, the emulsifier and water are not always required.

Although the anti-contamination agent composition according to the present embodiments is applied to the drier rolls in the dry part (see FIG. 1), the composition may be applied not only to a dry part, but to a canvas, a canvas roll, a calender roll, and a breaker stack roll, etc.

For the anti-contamination agent composition according to the present embodiments, although the drier roll is made of cast-iron, it may be made of another material.

EXAMPLE

Examples and Comparative Examples

Active components (the linear polysiloxane compound and the cyclic siloxane compound) with the structures and in the blending quantities shown in following Table 1 were dispersed in water to prepare samples of Examples 1 to 31 and Comparative examples 1 to 9. It should be noted that, as the linear polysiloxane compound, the compound shown in formula (1) was used, and as the cyclic siloxane compound, a mixture or equal quantities of octamethylcyclotetrasiloxane, decamethylcyclopentasiloxane, and dodecamethylcyclohexasiloxane was used.

(Evaluation 1)

For the samples from Examples 1 to 31 and Comparative examples 1 to 9, 0.5 g of pitch was added to 10 ml of each sample and then pitch dispersibility was visually evaluated, respectively.

In the evaluation, a sample in which greater than or equal to 50% of the pitch was dispersed was evaluated as "⊚", a sample in which greater than or equal to 30% and less than 50% of the pitch was dispersed as "○", a sample in which 0 to less than 30% of the pitch was dispersed as "×".

The evaluation results are shown in Table 1.

(Evaluation 2)

The samples from Examples 1 to 31 and Comparative examples 1 to 9 were each applied to a drier roll of a real paper-making machine so that a spray quantity per unit area was 400 $\mu g/m^2$, and then contamination condition caused by pitch adhering to the drier roll was visually evaluated after 1 hour, respectively.

In the evaluation, a condition in which the surface of the drier roll had no stain adhesion was evaluated as "⊚", a condition in which less than 10% of the entire surface of the drier roll had stain adhesion as "○", a condition in which greater than or equal to 10% and less than 30% of the entire surface of the drier roll had stain adhesion as "Δ", a condition in which greater than or equal to 30% of the entire surface of the drier roll had stain adhesion as "×". It should be noted that, if the evaluation is "⊚", "○", or "Δ", it shows the contamination preventing effect based on the anti-contamination agent composition is exerted.

The evaluation results are shown in Table 1.

TABLE 1

| | The linear polysiloxane compounds represented by formula (1) | | | | | The cyclic siloxane compounds | | |
| --- | --- | --- | --- | --- | --- | --- | --- | --- |
| | R1 | n | R2 | R3 | m | Blending quantity (ppm) | Blending quantity (ppm) | Pitch dispersibility | Contamination condition |
| Ex. 1 | All groups are methyl groups | 20 | — | — | — | 100000 | 500 | ○ | Δ |
| Ex. 2 | All groups are methyl groups | 130 | — | — | — | 100000 | 500 | ○ | Δ |
| Ex. 3 | All groups are methyl groups | 800 | — | — | — | 100000 | 500 | ○ | Δ |
| Ex. 4 | All groups are methyl groups | 1430 | — | — | — | 100000 | 500 | ○ | Δ |
| Ex. 5 | 15 polyether groups per molecule, the others are methyl groups | 20 | — | — | — | 100000 | 500 | ○ | Δ |
| Ex. 6 | 15 polyether groups per molecule, the others are methyl groups | 130 | — | — | — | 100000 | 500 | ○ | Δ |
| Ex. 7 | 15 polyether groups per molecule, the others are methyl groups | 800 | — | — | — | 100000 | 500 | ○ | Δ |
| Ex. 8 | 15 polyether groups per molecule, the others are methyl groups | 1430 | — | — | — | 100000 | 500 | ○ | Δ |
| Ex. 9 | 1 amino-modified group per molecule, the others are methyl groups | 20 | Propylene group | Ethylene group | 1 | 100000 | 500 | ○ | ○ |
| Ex. 10 | 1 amino-modified group per molecule, the others are methyl groups | 130 | Propylene group | Ethylene group | 1 | 100000 | 500 | ○ | ◎ |
| Ex. 11 | 1 amino-modified group per molecule, the others are methyl groups | 800 | Propylene group | Ethylene group | 1 | 100000 | 500 | ○ | ◎ |
| Ex. 12 | 1 amino-modified group per molecule, the others are methyl groups | 1430 | Propylene group | Ethylene group | 1 | 100000 | 500 | ○ | ○ |
| Ex. 13 | 1 amino-modified group per molecule, the others are methyl groups | 130 | Methylene group | Ethylene group | 1 | 100000 | 500 | ○ | ○ |
| Ex. 14 | 1 amino-modified group per molecule, the others are methyl groups | 130 | Heptylene group | Ethylene group | 1 | 100000 | 500 | ○ | ○ |
| Ex. 15 | 1 amino-modified group per molecule, the others are methyl groups | 130 | Propylene group | Methylene group | 1 | 100000 | 500 | ○ | ○ |
| Ex. 16 | 1 amino-modified group per molecule, the others are methyl groups | 130 | Propylene group | Heptylene group | 1 | 100000 | 500 | ○ | ○ |
| Ex. 17 | 1 amino-modified group per molecule, the others are methyl groups | 130 | — | Ethylene group | 0 | 100000 | 500 | ○ | ○ |
| Ex. 18 | 1 amino-modified group per molecule, the others are methyl groups | 130 | Propylene group | Ethylene group | 2 | 100000 | 500 | ○ | ○ |
| Ex. 19 | 1 amino-modified group per molecule, the others are methyl groups | 130 | Propylene group | Ethylene group | 1 | 100000 | 10 | ○ | ○ |
| Ex. 20 | 1 amino-modified group per molecule, the others are methyl groups | 130 | Propylene group | Ethylene group | 1 | 100000 | 15 | ○ | ◎ |
| Ex. 21 | 1 amino-modified group per molecule, the others are methyl groups | 130 | Propylene group | Ethylene group | 1 | 100000 | 300 | ◎ | ◎ |
| Ex. 22 | 1 amino-modified group per molecule, the others are methyl groups | 130 | Propylene group | Ethylene group | 1 | 100000 | 5000 | ◎ | ◎ |
| Ex. 23 | 1 amino-modified group per molecule, the others are methyl groups | 130 | Propylene group | Ethylene group | 1 | 100000 | 10000 | ◎ | ◎ |
| Ex. 24 | 1 amino-modified group per molecule, the others are methyl groups | 130 | Propylene group | Ethylene group | 1 | 100000 | 20000 | ○ | ○ |
| Ex. 25 | 1 amino-modified group per molecule, the others are methyl groups | 130 | Propylene group | Ethylene group | 1 | 100000 | 30000 | ○ | ○ |
| Ex. 26 | 1 amino-modified group per molecule, the others are methyl groups | 130 | Propylene group | Ethylene group | 1 | 500 | 500 | ○ | Δ |
| Ex. 27 | 1 amino-modified group per molecule, the others are methyl groups | 130 | Propylene group | Ethylene group | 1 | 2500 | 500 | ◎ | ○ |
| Ex. 28 | 1 amino-modified group per molecule, the others are methyl groups | 130 | Propylene group | Ethylene group | 1 | 500000 | 500 | ◎ | ◎ |
| Ex. 29 | 1 amino-modified group per molecule, the others are methyl groups | 130 | Propylene group | Ethylene group | 1 | 5000000 | 500 | ◎ | ○ |
| Ex. 30 | 1 amino-modified group per molecule, the others are methyl groups | 130 | Propylene group | Ethylene group | 1 | 25000000 | 500 | ◎ | ○ |
| Ex. 31 | 1 amino-modified group per molecule, the others are methyl groups | 130 | Propylene group | Ethylene group | 1 | 50000000 | 500 | ○ | ○ |
| Comp. ex. 1 | All groups are methyl groups | 15 | — | — | — | 100000 | 500 | X | X |
| Comp. ex. 2 | All groups are methyl groups | 1500 | — | — | — | 100000 | 500 | X | X |
| Comp. ex. 3 | 15 polyether groups per molecule, the others are methyl groups | 15 | — | — | — | 100000 | 500 | X | X |
| Comp. ex. 4 | 15 polyether groups per molecule, the others are methyl groups | 1500 | — | — | — | 100000 | 500 | X | X |
| Comp. ex. 5 | 1 amino-modified group per molecule, the others are methyl groups | 15 | Propylene group | Ethylene group | 1 | 100000 | 500 | X | X |
| Comp. ex. 6 | 1 amino-modified group per molecule, the others are methyl groups | 1500 | Propylene group | Ethylene group | 1 | 100000 | 500 | X | X |

TABLE 1-continued

| | The linear polysiloxane compounds represented by formula (1) | | | | | The cyclic siloxane compounds | | |
|---|---|---|---|---|---|---|---|---|
| | R1 | n | R2 | R3 | m | Blending quantity (ppm) | Blending quantity (ppm) | Pitch dispersibility | Contamination condition |
| Comp. ex. 7 | All groups are methyl groups | 1430 | — | — | — | 100000 | 0 | X | X |
| Comp. ex. 8 | 15 polyether groups per molecule, the others are methyl groups | 1430 | — | — | — | 100000 | 0 | X | X |
| Comp. ex. 9 | 1 amino-modified group per molecule, the others are methyl groups | 1430 | Propylene group | Ethylene group | 1 | 100000 | 0 | X | X |

The results shown in Table 1 obviously demonstrates that the samples of Examples 1 to 31 have excellent pitch dispersibility and can sufficiently inhibit the contamination of the drier roll, as compared with Comparative examples 1 to 9.

Consequently, the anti-contamination agent composition according to the present invention can effectively prevent pitch contamination of a dry part.

INDUSTRIAL APPLICABILITY

The anti-contamination agent composition of the present invention is used by applying it to a dry past in a paper-making process. The anti-contamination agent composition of the present invention can effectively prevent pitch contamination of the dry part, which can significantly improve yield in paper manufacturing.

REFERENCE SIGNS LIST

B . . . breaker stack roll,
C . . . calender roll
D . . . dry part
D1, D2, D3, D4, D5, D6, D7, D8 . . . drier roll,
K1, K2 . . . canvas,
KR . . . canvas roll,
W . . . wet paper sheet

The invention claimed is:

1. An anti-contamination agent composition for preventing pitch contamination in a dry part of a paper-making process, comprising:
a linear polysiloxane compound represented by following formula (1), and
a cyclic siloxane compound,
wherein at least one of the substituents $R^1$ in one molecule are an amino-modified group represented by following formula (2);
the cyclic siloxane compound is at least one compound selected from the group consisting of octamethylcyclotetrasiloxane, decamethylcyclopentasiloxane, and dodecamethylcyclohexasiloxane;
a blending quantity of the cyclic siloxane compound is 15 to 20,000 ppm; and
a blending mass ratio of the cyclic siloxane compound and the polysiloxane compound is 1:5 to 50,000:

Formula 1

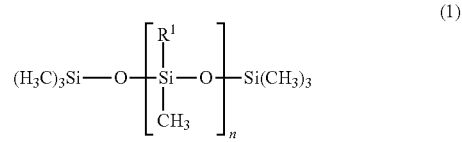

wherein substituents $R^1$ represent a hydrogen atom, an alkyl group, a methylphenyl group, a polyether group, a higher fatty acid ester group, an amino-modified group, an epoxy-modified group, a carboxy group, a phenol group, a mercapto group, a carbinol group, or a methacryl group, and the number n of repeating siloxane units represents an integer from 20 to 1430, and Formula 2

wherein substituents $R^2$ and $R^3$ each independently represent an alkylene group having 1 to 6 carbon atoms, and the number m of repeating aminoalkylene units represents 1.

2. The anti-contamination agent composition according to claim 1,
wherein the anti-contamination agent composition further containing an emulsifier and water is emulsion.

3. The anti-contamination agent composition according to claim 1,
wherein the anti-contamination agent composition is applied to a cast-iron drier roll in the dry part,
the anti-contamination agent composition having a surface tension of 65 mN/m or less, and
having a contact angle to the drier roll of 80° or less.

4. The anti-contamination agent composition according to claim 1,
wherein the anti-contamination agent composition is applied to a polyester canvas in the dry part,
the anticontamination agent composition having a surface tension of 65 mN/m or less, and
having a contact angle to the canvas of 80° or less.

5. The anti-contamination agent composition according to claim 1,
wherein a substituent of the cyclic siloxane compound is an amino-modified group;
the substituent of the cyclic siloxane compound is the same as substituents $R^1$ of the linear polysiloxane compound.

6. The anti-contamination agent composition according to claim 1,
wherein the cyclic siloxane compounds of octamethylcyclotetrasiloxane having an amino-modified group, decamethylcyclopentasiloxane having an amino-modified group, and dodecamethylcyclohexasiloxane having an amino-modified group are all contained;
the quantity of octamethylcyclotetrasiloxane and decamethylcyclopentasiloxane makes up greater than or equal to 70% of the total quantity of the cyclic siloxane compounds.

7. The anti-contamination agent composition according to claim 1,
wherein the substituent $R^2$ being propylene group and the substituent $R^3$ being ethylene group.

8. The anti-contamination agent composition according to claim 1,
wherein the number of the amino-modified groups per molecule of the polysiloxane compound is 0.5 to 3.

9. The anti-contamination agent composition according to claim 1,
wherein the number n of repeating siloxane units is an integer from 100 to 800.

10. The anti-contamination agent composition according to claim 1,
wherein the polysiloxane compound has a kinematic viscosity at 25° C. that is 10,000 $mm^2$/s or less.

11. The anti-contamination agent composition according to claim 1,
wherein a blending ratio of the polysiloxane compound is 2.0 to 20% by mass.

12. The anti-contamination agent composition according to claim 1,
wherein a blending quantity of the cyclic siloxane compound is 100 to 1,000 ppm.

13. The anti-contamination agent composition according to claim 2,
wherein the emulsifier is a nonionic surfactant.

14. The anti-contamination agent composition according to claim 2,
wherein a blending ratio of the emulsifier relative to 1 part by mass of the polysiloxane compound is 0.1 to 0.2 part by mass.

* * * * *